US012570837B2

(12) United States Patent
Torii et al.

(10) Patent No.: US 12,570,837 B2
(45) Date of Patent: Mar. 10, 2026

(54) POLYCARBONATE RESIN COMPOSITION AND MOLDED ARTICLE

(71) Applicant: IDEMITSU KOSAN CO., LTD., Tokyo (JP)

(72) Inventors: Takahiro Torii, Taipei (TW); Shuya Nagayama, Chiba (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 577 days.

(21) Appl. No.: 17/801,436

(22) PCT Filed: Feb. 25, 2021

(86) PCT No.: PCT/JP2021/007197

§ 371 (c)(1),
(2) Date: Aug. 22, 2022

(87) PCT Pub. No.: WO2021/172472

PCT Pub. Date: Sep. 2, 2021

(65) Prior Publication Data

US 2023/0109349 A1 Apr. 6, 2023

(30) Foreign Application Priority Data

Feb. 27, 2020 (JP) ................................ 2020-031887

(51) Int. Cl.
*C08K 13/02* (2006.01)

(52) U.S. Cl.
CPC .................................. *C08K 13/02* (2013.01)

(58) Field of Classification Search
CPC ........ C08K 5/1345; C08K 5/13; C08K 5/524; C08K 5/005; G02B 19/0061; G02B 1/041
See application file for complete search history.

(56) References Cited

U.S. PATENT DOCUMENTS

| | | | |
|---|---|---|---|
| 9,708,487 B2 | 7/2017 | Takimoto et al. | |
| 2020/0216662 A1* | 7/2020 | Yamazaki | C08L 69/00 |
| 2022/0025175 A1 | 1/2022 | Isozaki et al. | |

FOREIGN PATENT DOCUMENTS

| | | | | |
|---|---|---|---|---|
| CN | 107245233 A | 10/2017 | | |
| JP | 2011207954 A | * 10/2011 | | C08K 5/103 |
| JP | 2014-062203 A | 4/2014 | | |
| JP | 2014-210872 A | 11/2014 | | |
| JP | 5938419 B2 | 6/2016 | | |
| JP | 5991420 B2 | 9/2016 | | |
| JP | 6427299 B1 | 11/2018 | | |
| JP | 2019-006874 A | 1/2019 | | |
| JP | 2019-131786 A | 8/2019 | | |
| TW | 201412867 A | 4/2014 | | |
| WO | WO-2011/064897 A1 | 6/2011 | | |
| WO | WO-2014/191942 A1 | 12/2014 | | |
| WO | WO-2018/181949 A1 | 10/2018 | | |
| WO | WO2019026784 A1 * | 2/2019 | | C08L 69/00 |

OTHER PUBLICATIONS

JP2011207954A (Year: 2011).*
International Searching Authority, "International Search Report," issued in connection with International Patent Application No. PCT/JP2021/007197, dated Apr. 20, 2021.
International Searching Authority, "Written Opinion," issued in connection with International Patent Application No. PCT/JP2021/007197, dated Apr. 20, 2021.
Office Action issued in corresponding Taiwanese Patent Application No. 110107058 dated Oct. 11, 2024 (16 pages).
Office Action issued in corresponding Japanese Patent Application No. 2020-031887 dated Jan. 30, 2024 (7 pages).
Office Action issued in connection with Chinese Appl. No. 202180016129.X dated Oct. 28, 2023 (15 pages).
Office Action issued in corresponding Chinese Patent Application No. 202180016129.X dated Oct. 31, 2024.
Office Action issued in corresponding Chinese Patent Application No. 202180016129.X dated Apr. 19, 2024 (13 pages).
Office Action issued in corresponding Japanese Patent Application No. 2020-031887 dated Sep. 5, 2023 (9 pages).
Office Action issued in corresponding Korean Patent Application No. 10-2022-7027955 dated Dec. 19, 2025.

* cited by examiner

*Primary Examiner* — Catherine S Branch
*Assistant Examiner* — Huihong Qiao
(74) *Attorney, Agent, or Firm* — Foley & Lardner LLP

(57) ABSTRACT

Provided is a polycarbonate resin composition, including: an aromatic polycarbonate resin (A); a predetermined antioxidant (B1); a phenol-based antioxidant (C); an alicyclic epoxy compound (D); and a UV absorber (E), wherein a content of the component (B1) is 0.01 to 0.08 part by mass, a content of the component (C) is 0.005 to 0.15 part by mass, a content of the component (D) is 0.005 to 0.2 part by mass, and a content of the component (E) is 0.1 to 0.4 part by mass with respect to 100 parts by mass of the component (A), and wherein the polycarbonate resin composition is substantially free of bis(2,6-di-tert-butyl-4-methylphenyl)pentaerythritol diphosphite (Z1) and triphenylphosphine (Z2).

11 Claims, No Drawings

POLYCARBONATE RESIN COMPOSITION AND MOLDED ARTICLE

CROSS-REFERENCE TO RELATED APPLICATIONS

The present application claims priority under 37 U.S.C. § 371 to International Patent Application No. PCT/JP2021/007197, filed Feb. 25, 2021, which claims priority to and the benefit of Japanese Patent Application No. 2020-031887, filed on Feb. 27, 2020. The contents of these applications are hereby incorporated by reference in their entireties.

TECHNICAL FIELD

The present invention relates to a polycarbonate resin composition and a molded body.

BACKGROUND ART

An aromatic polycarbonate resin is excellent in, for example, transparency, mechanical properties, thermal properties, and electrical properties, and has been used in various optical molded articles, such as a light-guiding member, for example, a light-guiding plate, a lens, and an optical fiber, through the utilization of its characteristics. In addition, the applications of a light-emitting diode (LED) not only as electrical and electronic products, such as a display, a cellular phone, and a video camera, but also as lighting devices and the like have started to spread.

In view of the foregoing, an investigation has been made on the use of a polycarbonate resin composition in a lens part for forming a LED lighting device. The polycarbonate resin composition to be used as a lens for LED lighting is required to have an excellent color tone (an initial YI value and an initial haze value) in a relatively short optical path length of from about 1 mm to about 30 mm, which corresponds to the thickness of the lens, and high durability (moist heat resistance, heat resistance, light fastness, and LED irradiation resistance).

In addition, with regard to the molding temperature of the polycarbonate resin composition, a thin-walled transparent part such as a light-guiding plate is often molded at a temperature as high as 300° C. or more, and a thick-walled part or an elongated part such as a light-guiding part for the daytime running light (DRL) of a vehicle or the like is often molded at a temperature as low as 280° C. or less. Meanwhile, the lens part for forming a LED lighting device has a thickness of from about 1 mm to about 30 mm, and hence its injection molding is often performed at a temperature of about 280° C. or more and about 300° C. or less.

In PTL 1, as a polycarbonate resin composition that is excellent in heat stability in molding at a high temperature exceeding 300° C., and that is intended to provide a molded article having a satisfactory light transmittance and a satisfactory luminance, and free from causing any discoloration or crack after its moist heat resistance test, there is a disclosure of a resin composition obtained by blending an aromatic polycarbonate resin with specific amounts of a specific diphosphite compound and an alicyclic epoxy compound.

In PTL 2, as a polycarbonate resin composition intended to provide a molded article, which is suitable for the application of a light-guiding part for, for example, a DRL for a vehicle, has a satisfactory initial color tone after its molding at a temperature as low as 280° C. or less, and is excellent in long-term moist heat resistance and long-term heat resistance, there is a disclosure of a resin composition obtained by blending an aromatic polycarbonate resin with specific amounts of a specific alicyclic epoxy compound, a specific phosphite-based antioxidant, and a specific phosphorous compound.

In PTL 3, as a polycarbonate resin composition intended to provide a molded article, which is suitable for the application of a light-guiding member to be built in a lighting apparatus for an automobile and has a significantly excellent hue, there is a disclosure of a resin composition obtained by blending an aromatic polycarbonate resin with specific amounts of a specific phosphite-based stabilizer and a specific polyalkylene glycol compound.

In PTL 4, as a polycarbonate resin composition intended to provide a molded article having a high degree of weatherability even when reduced in UV absorber content, there is a disclosure of a resin composition obtained by blending an aromatic polycarbonate resin with specific amounts of a specific UV absorber, a specific epoxy compound, and a specific phosphorous-based stabilizer.

CITATION LIST

Patent Literature

PTL 1: JP 5938419 B2

PTL 2: JP 6427299 B1

PTL 3: JP 5991420 B2

PTL 4: JP 2019-006874 A

SUMMARY OF INVENTION

Technical Problem

However, the polycarbonate resin compositions disclosed in PTLs 1 to 3 each have a design in which more emphasis is placed on a color tone so that the composition may be used in the applications of products each having a relatively long optical path length (of, for example, 100 mm or more). In addition, the polycarbonate resin composition disclosed in PTL 4 cannot sufficiently satisfy the above-mentioned characteristics required in the applications of lens parts for LED lighting. In particular, along with a recent increase in LED output, the LED irradiation resistance of a lens part needs to be markedly improved.

An object to be achieved by the present invention is to provide a polycarbonate resin composition from which a molded body having an excellent color tone in a short optical path length and high durability (moist heat resistance, heat resistance, light fastness, and LED irradiation resistance) can be produced.

Solution to Problem

The inventors of the present invention have found that the above-mentioned object can be achieved by a resin composition obtained by blending an aromatic polycarbonate resin with a specific amount of each of an alicyclic epoxy compound, a predetermined antioxidant, a predetermined phosphorus compound, and a predetermined UV absorber.

That is, the present invention relates to the following polycarbonate resin composition and molded body.

<1> A polycarbonate resin composition, comprising:

an aromatic polycarbonate resin (A);

a pentaerythritol diphosphite compound (B1) represented by the following formula (B1);

a phenol-based antioxidant (C);

an alicyclic epoxy compound (D); and a UV absorber (E), wherein a content of the component (B1) is 0.01 part by mass or more and 0.08 part by mass or less, a content of the component (C) is 0.005 part by mass or more and 0.15 part by mass or less, a content of the component (D) is 0.005 part by mass or more and 0.2 part by mass or less, and a content of the component (E) is 0.1 part by mass or more and 0.4 part by mass or less with respect to 100 parts by mass of the component (A), and wherein the polycarbonate resin composition is substantially free of bis(2,6-di-tert-butyl-4-methylphenyl)pentaerythritol diphosphite (Z1) and triphenylphosphine (Z2):

(B1)

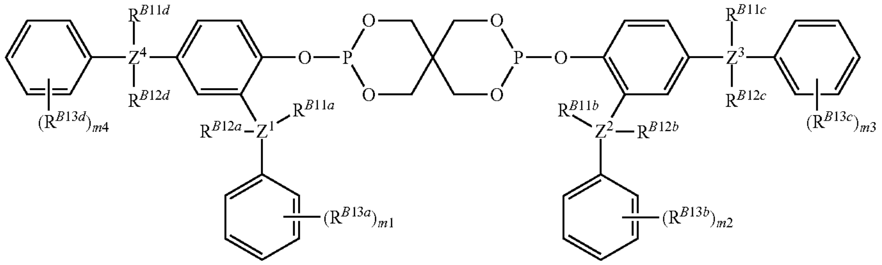

wherein in the formula (B1), $R^{B11a}$ to $R^{B11d}$ and $R^{B12a}$ to $R^{B12d}$ each represent an alkyl group or an alkenyl group, and may be identical to or different from each other, or $R^{B11a}$ and $R^{B12a}$, $R^{B11b}$ and $R^{B12b}$, $R^{B11c}$ and $R^{B12c}$, or $R^{B11d}$ and $R^{B12d}$ may be bonded to each other to form a ring, $R^{B13a}$ to $R^{B13d}$ each represent a hydrogen atom or an alykyl group, and may be identical to or different from each other, m1 to m4 each represent an integer of 0 or more and 5 or less, and may be identical to or different from each other, and when any one of m1 to m4 represents 2 or more, a plurality of $R^{B13a}$s, $R^{B13b}$s, $R^{B13c}$s, or $R^{B13d}$s may be identical to or different from each other, and $Z^1$ to $Z^4$ each represent a single bond or a carbon atom, and may be identical to or different from each other, and when any one of $Z^1$ to $Z^4$ represents a single bond, corresponding two of $R^{B11a}$ to $R^{B11d}$ and $R^{B12a}$ to $R^{B12d}$ are excluded from the formula (B1).

<2> The polycarbonate resin composition according to the above-mentioned item <1>, further comprising a compound (B2) represented by the following formula (B2), wherein a content of the component (B2) is more than 0 parts by mass and 0.25 part by mass or less with respect to 100 parts by mass of the component (A).

(B2)

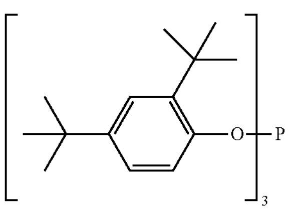

<3> The polycarbonate resin composition according to the above-mentioned item <1> or <2>, wherein the component (E) is a bisbenzoxazinone compound.

<4> The polycarbonate resin composition according to any one of the above-mentioned items <1> to <3>, further comprising a polyether compound (F) represented by the following formula (F1):

$$R^{F3}O—(R^{F1}O)_m\text{-}A\text{-}(R^{F2}O)_n—R^{F4} \quad (F1)$$

wherein $R^{F1}$ and $R^{F2}$ each represent an alkylene group having 1 or more carbon atoms, and $R^{F1}$ and $R^{F2}$ may be identical to or different from each other, m+n is 5 or more and less than 300, and when "m" represents 2 or more, $R^{F1}$s may be identical to or different from each other, and when "n" represents 2 or more, $R^{F2}$s may be identical to or different from each other, $R^{F3}$ and $R^{F4}$ each represent a hydrogen atom, a monovalent hydrocarbon group having 1 to 30 carbon atoms, an alkanoyl group having 1 to 30 carbon atoms, an alkenoyl group having 2 to 30 carbon atoms, or a glycidyl group, and $R^{F3}$ and $R^{F4}$ may be identical to or different from each other, and A represents a single bond or a divalent organic group, wherein a content of the component (F) is more than 0 parts by mass and 0.4 part by mass or less with respect to 100 parts by mass of the component (A).

<5> The polycarbonate resin composition according to any one of the above-mentioned items <1> to <4>, further comprising a release agent (G).

<6> The polycarbonate resin composition according to the above-mentioned item <5>, wherein the component (G) is a fatty acid ester (G1), and a content of the component (G) is 0.005 part by mass or more and 0.1 part by mass or less with respect to 100 parts by mass of the component (A).

<7> The polycarbonate resin composition according to any one of the above-mentioned items <1> to <6>, wherein the component (A) contains at least one kind selected from a polycarbonate-based resin (A-1) having a branched structure and an aromatic polycarbonate-based resin (A-2) except the polycarbonate-based resin (A-1) having a branched structure.

<8> The polycarbonate resin composition according to any one of the above-mentioned items <1> to <7>, wherein the component (A) has a viscosity-average molecular weight of 10,000 or more and 30,000 or less.

<9> A molded body, comprising the polycarbonate resin composition of any one of the above-mentioned items <1> to <8>.

<10> The molded body according to the above-mentioned item <9>, wherein the molded body is a member for LED lighting.

<11> The molded body according to the above-mentioned item <10>, wherein the molded body is a lens part.

Advantageous Effects of Invention

The molded body formed of the polycarbonate resin composition of the present invention has an excellent color tone in a short optical path length and high durability (moist heat resistance, heat resistance, light fastness, and LED irradiation resistance). The molded body is suitable as a member for LED lighting.

DESCRIPTION OF EMBODIMENTS

Polycarbonate Resin Composition

A polycarbonate resin composition of the present invention includes:

an aromatic polycarbonate resin (A);

a pentaerythritol diphosphite compound (B1) represented by the following formula (B1);

a phenol-based antioxidant (C);

an alicyclic epoxy compound (D); and a UV absorber (E), wherein a content of the component (B1) is 0.01 part by mass or more and 0.08 part by mass or less, a content of the component (C) is 0.005 part by mass or more and 0.15 part by mass or less, a content of the component (D) is 0.005 part by mass or more and 0.2 part by mass or less, and a content of the component (E) is 0.1 part by mass or more and 0.4 part by mass or less with respect to 100 parts by mass of the component (A):

(B1)

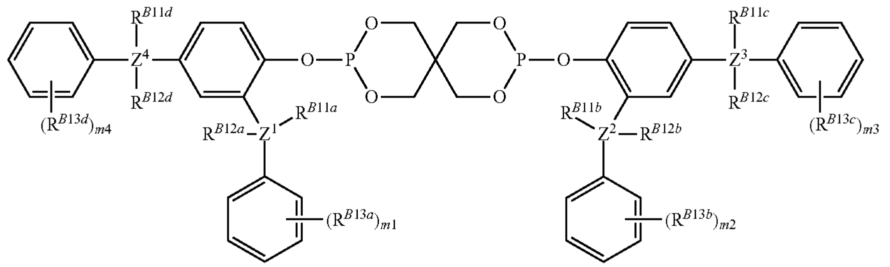

wherein in the formula (B1), $R^{B11a}$ to $R^{B11d}$ and $R^{B12a}$ to $R^{B12d}$ each represent an alkyl group or an alkenyl group, and may be identical to or different from each other, or $R^{B11a}$ and $R^{B12a}$, $R^{B11b}$ and $R^{B12b}$, $R^{B11c}$ and $R^{B12c}$, or $R^{B11d}$ and $R^{B12d}$ may be bonded to each other to form a ring, $R^{B13a}$ to $R^{B13d}$ each represent a hydrogen atom or an alkyl group, and may be identical to or different from each other, m1 to m4 each represent an integer of 0 or more and 5 or less, and may be identical to or different from each other, and when any one of m1 to m4 represents 2 or more, a plurality of $R^{B13a}$s, $R^{B13b}$s, $R^{B13c}$s, or $R^{B13d}$s may be identical to or different from each other, and Z1 to $Z^4$ each represent a single bond or a carbon atom, and may be identical to or different from each other, and when any one of $Z^1$ to $Z^4$ represents a single bond, corresponding two of $R^{B11a}$ to $R^{B11d}$ and $R^{B12a}$ to $R^{B12d}$ are excluded from the formula (B1).

The polycarbonate resin composition of the present invention may further include a compound (B2) represented by the following formula (B2) as an optional component, and preferably includes more than 0 parts by mass and 0.25 part by mass or less of the component (B2) with respect to 100 parts by mass of the component (A).

The polycarbonate resin composition of the present invention may further include a polyether compound (F) or a release agent (G).

(B2)

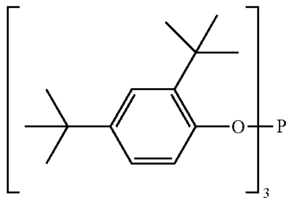

The polycarbonate resin composition of the present invention is substantially free of bis(2,6-di-tert-butyl-4-methylphenyl)pentaerythritol diphosphite (Z1) and triphenylphosphine (Z2) from the viewpoint of an improvement in LED irradiation resistance. In the present invention, when the polycarbonate resin composition includes the component (Z1), excellent LED irradiation resistance is not obtained, and it becomes difficult to maintain more excellent long-term moist heat resistance. In the present invention, when the polycarbonate resin composition includes the component (Z2), it becomes difficult to obtain excellent LED irradiation resistance.

In the present invention, the phrase "substantially free of a component X" means that "the component X is not intentionally incorporated," and specifically means that the content of the component X is typically less than 0.01 part by mass, preferably less than 0.001 part by mass, more preferably less than 0.0001 part by mass with respect to 100 parts by mass of the component (A) (the phrase has the same meaning also in the following description).

When the polycarbonate resin composition is utilized as a lens part for LED lighting, it is important to prevent the opacification, yellowing (at the initial stage of deterioration), scorching, and deformation (at the terminal stage of the deterioration) of the composition caused by irradiation with light from a high-output LED and the concentration of the light. Further, the deterioration of the resin of the lens part for LED lighting is liable to occur because the lens part is irradiated with light from a LED at a higher output as compared to a light-guiding part for the DRL of a vehicle or the like. Further, unlike a DRL part and the like, it is difficult to notice the occurrence of the deterioration of a lighting device. Accordingly, there is a problem in that the deterioration may lead to troubles such as the falling of a damaged product of the device due to its deformation. In view of the foregoing, the composition is required to have such high durability against LED irradiation (LED irradiation resistance) as to be capable of suppressing those troubles from the viewpoint of safety.

In addition, a molded body containing a UV absorber tends to show a high yellow tinge, and hence has involved a problem in that the color tone of the molded body is poor. Further, the molded body has an ability to absorb light in a visible light region. Accordingly, the molded body is liable to absorb a LED light beam to generate heat, and hence the light beam is converted into heat. Accordingly, the molded body also has involved a problem in that the molded body is liable to deteriorate.

The polycarbonate resin composition of the present invention has the above-mentioned configuration, and hence enables the production of a molded body having an excellent color tone in a short optical path length and high durability (moist heat resistance, heat resistance, light fastness, and LED irradiation resistance). The molded body of the present invention has high light fastness and high moist heat resistance, and hence can be used even in outdoor applications over a long time period. Further, the lifetime of the molded body of the present invention can be maintained even when the output of a LED is increased, and the heat resistance thereof is high. Accordingly, even when the molded body is placed around a LED chip whose temperature increases, it becomes possible to suppress the occurrence of its yellowing and opacification.

In this description, an initial YI value and an initial haze value are used in the evaluation of the color tone of the molded body. A state in which the YI value is low and the haze value is also low means that the molded body has a satisfactory initial color tone, and is hence excellent in optical characteristics.

In addition, an upper limit value and a lower limit value described herein for a numerical range may be arbitrarily combined.

In addition, two or more embodiments that are not contrary to each other out of the individual embodiments of an aspect according to the present invention to be described below may be combined, and an embodiment in which the two or more embodiments are combined is also an embodiment of the aspect according to the present invention.

The respective components to be used in the polycarbonate resin composition of the present invention are described below.

Aromatic Polycarbonate Resin (A)

The aromatic polycarbonate resin (A) (hereinafter sometimes referred to as "component (A)") to be incorporated into the polycarbonate resin composition of the present invention is not particularly limited, and a resin produced by a known method may be used.

For example, a resin produced by causing a dihydric phenol and a carbonate precursor to react with each other by a solution method (interfacial polycondensation method) or a melting method (ester exchange method), i.e., a resin produced by the interfacial polycondensation method involving causing the dihydric phenol and phosgene to react with each other in the presence of an end terminator, or by causing the dihydric phenol and diphenyl carbonate or the like to react with each other in the presence of the end terminator according to the ester exchange method or the like may be used as the aromatic polycarbonate resin (A).

Examples of the dihydric phenol may include various dihydric phenols, in particular: bis(hydroxyphenyl)alkane-based compounds, such as 2,2-bis(4-hydroxyphenyl)propane [bisphenol A], bis(4-hydroxyphenyl)methane, 1,1-bis (4-hydroxyphenyl)ethane, and 2,2-bis(4-hydroxy-3,5-dimethylphenyl)propane; 4,4'-dihydroxydiphenyl, a bis(4-hydroxyphenyl)cycloalkane, bis(4-hydroxyphenyl) oxide, bis(4-hydroxyphenyl) sulfide, bis(4-hydroxyphenyl) sulfone, bis(4-hydroxyphenyl) sulfoxide, and bis(4-hydroxyphenyl) ketone. In addition, the examples may also include hydroquinone, resorcin, and catechol. Those dihydric phenols may be used alone or in combination thereof.

Among them, one or more kinds of bis(hydroxyphenyl) alkane-based compounds selected from the group consisting of 2,2-bis(4-hydroxyphenyl)propane [bisphenol A], bis(4-hydroxyphenyl)methane, and 1,1-bis(4-hydroxyphenyl)ethane are preferred, and bisphenol A is particularly suitable.

Examples of the carbonate precursor include a carbonyl halide, a carbonyl ester, and a haloformate. The carbonate precursor is specifically phosgene, a dihaloformate of a dihydric phenol, diphenyl carbonate, dimethyl carbonate, diethyl carbonate, or the like.

The aromatic polycarbonate resin (A) may contain a polycarbonate-based resin (A-1) having a branched structure. That is, the aromatic polycarbonate resin (A) preferably contains at least one kind selected from a polycarbonate-based resin (A-1) having a branched structure and an aromatic polycarbonate-based resin (A-2) except the polycarbonate-based resin (A-1) having a branched structure.

As a branching agent to be used for introducing a branched structure in the polycarbonate-based resin (A-1) having a branched structure, there are given, for example, 1,1,1-tris(4-hydroxyphenyl)ethane, α,α',α"-tris(4-hydroxyphenyl)-1,3,5-triisopropylbenzene, phloroglucin, trimellitic acid, and 1,3-bis(o-cresol). When the polycarbonate-based resin (A-1) having a branched structure is used, the melt tension of the material is improved, and hence a phenomenon in which a lens deforms to fall after its deterioration can be suppressed.

A monovalent carboxylic acid or a derivative thereof or a monohydric phenol may be used as the end terminator. Examples thereof may include p-tert-butylphenol, p-phenylphenol, p-cumylphenol, p-perfluorononylphenol, p-(perfluorononylphenyl)phenol, p-(perfluorohexylphenyl)phenol, p-tert-perfluorobutylphenol, 1-(p-hydroxybenzyl)perfluorodecane, p-[2-(1H,1H-perfluorotridodecyloxy)-1,1,1,3,3,3-hexafluoropropyl]phenol, 3,5-bis(perfluorohexyloxycarbonyl)phenol, perfluorododecyl p-hydroxybenzoate, p-(1H, 1H-perfluorooctyloxy)phenol, 2H,2H,9H-perfluorononanoic acid, and 1,1,1,3,3,3-hexafluoro-2-propanol.

It is preferred that the aromatic polycarbonate resin (A) be a polycarbonate resin including, in a main chain thereof, a repeating unit represented by the following formula (I):

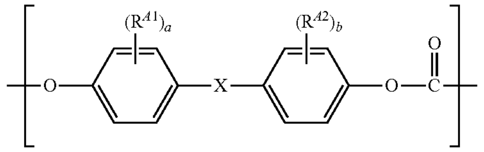

(I)

wherein $R^{A1}$ and $R^{A2}$ each represent an alkyl group or alkoxy group having 1 or more and 6 or less carbon atoms, and $R^{A1}$ and $R^{A2}$ may be identical to or different from each other, X represents a single bond, an alkylene group having 1 or more and 8 or less carbon atoms, an alkylidene group having 2 or more and 8 or less carbon atoms, a cycloalkylene group having 5 or more and 15 or less carbon atoms, a cycloalkylidene group having 5 or more and 15 or less carbon atoms, —S—, —SO—, —$SO_2$—, —O—, or —CO—, and "a" and "b" each independently represent an integer of 0 or more and 4 or less, when "a" represents 2 or more, $R^{A1}$s may be identical to or different from each other, and when "b" represents 2 or more, $R^{A2}$s may be identical to or different from each other.

Examples of the alkyl group represented by each of $R^{A1}$ and $R^{A2}$ include a methyl group, an ethyl group, a n-propyl group, an isopropyl group, various butyl groups (the term "various" means that a linear group and various branched groups are included, and the same holds true for the following), various pentyl groups, and various hexyl groups. An example of the alkoxy group represented by each of $R^{A1}$ and $R^{A2}$ is an alkoxy group whose alkyl group moiety is the alkyl group described above.

$R^{A1}$ and $R^{A2}$ each preferably represent an alkyl group having 1 or more and 4 or less carbon atoms or an alkoxy group having 1 or more and 4 or less carbon atoms.

Examples of the alkylene group represented by X include a methylene group, an ethylene group, a trimethylene group, a tetramethylene group, and a hexamethylene group. Among them, an alkylene group having 1 or more and 5 or less carbon atoms is preferred. Examples of the alkylidene group represented by X include an ethylidene group and an isopropylidene group. Examples of the cycloalkylene group represented by X include a cyclopentanediyl group, a cyclohexanediyl group, and a cyclooctanediyl group. Among them, a cycloalkylene group having 5 or more and 10 or less carbon atoms is preferred. Examples of the cycloalkylidene group represented by X include a cyclohexylidene group, a 3,5,5-trimethylcyclohexylidene group, and a 2-adamantylidene group. Among them, a cycloalkylidene group having 5 or more and 10 or less carbon atoms is preferred, and a cycloalkylidene group having 5 or more and 8 or less carbon atoms is more preferred.

"a" and "b" each independently represent an integer of 0 or more and 4 or less, preferably 0 or more and 2 or less, more preferably 0 or 1.

In the present invention, the aromatic polycarbonate resin (A) preferably contains a polycarbonate resin having a bisphenol A structure from the viewpoints of, for example, the transparency, mechanical characteristics, and thermal characteristics of a molded body to be obtained. The polycarbonate resin having a bisphenol A structure is specifically, for example, such a resin that X in the formula (I) represents an isopropylidene group. The content of the polycarbonate resin having a bisphenol A structure in the aromatic polycarbonate resin (A) is preferably 50 mass % or more and 100 mass % or less, more preferably 75 mass % or more and 100 mass % or less, still more preferably 85 mass % or more and 100 mass % or less.

In the present invention, the viscosity-average molecular weight (Mv) of the component (A) is preferably 10,000 or more, more preferably 11,000 or more, and is preferably 30,000 or less, more preferably 25,000 or less from the viewpoint of the flowability of the polycarbonate resin composition of the present invention. In particular, when the polycarbonate resin composition of the present invention is used in a member for LED lighting, the Mv of the aromatic polycarbonate resin (A) is preferably 11,500 or more, and is more preferably 23,500 or less.

The viscosity-average molecular weight (Mv) as used herein is calculated from the following equation after the determination of a limiting viscosity [η] through the measurement of the viscosity of a methylene chloride solution (concentration: g/L) at 20° C. with an Ubbelohde-type viscometer.

$$[\eta]=1.23\times10^{-5}Mv^{0.83}$$

The content of the component (A) in the polycarbonate resin composition of the present invention is preferably 50 mass % or more, more preferably 70 mass % or more, still more preferably 85 mass % or more, still further more preferably 95 mass % or more, still further more preferably 98 mass % or more from the viewpoint that the effects of the present invention are obtained. In addition, the upper limit of the content is preferably 99.9 mass % or less.

Pentaerythritol Diphosphite Compound (B1) Represented by Formula (B1)

The polycarbonate resin composition of the present invention includes the pentaerythritol diphosphite compound (B1) represented by the following formula (B1) (hereinafter sometimes referred to as "compound (B1)" or "component (B1)").

The incorporation of the component (B1) makes the molded body obtained from the polycarbonate resin composition of the present invention satisfactory particularly in terms of initial color tone in a short optical path length and long-term moist heat resistance:

(B1)

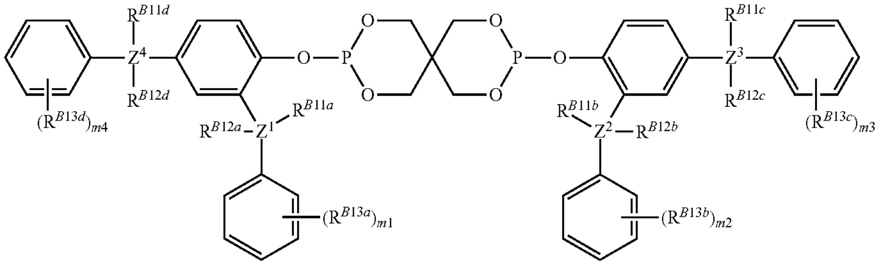

wherein in the formula (B1), $R^{B11a}$ to $R^{B11d}$ and $R^{B12a}$ to $R^{B12d}$ each represent an alkyl group or an alkenyl group, and may be identical to or different from each other, or $R^{B11a}$ and $R^{B12a}$, $R^{B11b}$ and $R^{B12b}$, $R^{B11c}$ and $R^{B12c}$, or $R^{B11d}$ and $R^{B12d}$ may be bonded to each other to form a ring, $R^{B13a}$ to $R^{B13d}$ each represent a hydrogen atom or an alkyl group, and may be identical to or different from each other, m1 to m4 each represent an integer of 0 or more and 5 or less, and may be identical to or different from each other, and when any one of m1 to m4 represents 2 or more, a plurality of $R^{B13a}$s, $R^{B13b}$s, $R^{B13c}$s, or $R^{B13d}$s may be identical to or different from each other, and $Z^1$ to $Z^4$ each represent a single bond or a carbon atom, and may be identical to or different from each other, and when any one of $Z^1$ to $Z^4$ represents a single bond, corresponding two of $R^{B11a}$ to $R^{B11d}$ and $R^{B12a}$ to $R^{B12d}$ are excluded from the formula (B1).

In the formula (B1), $R^{B11a}$ to $R^{B11d}$ and $R^{B12a}$ to $R^{B12d}$ each represent preferably an alkyl group having 1 or more and 5 or less carbon atoms, or an alkenyl group having 2 or more and 5 or less carbon atoms, more preferably an alkyl group having 1 or more and 3 or less carbon atoms, still more preferably a methyl group. It is still further more preferred that all of $R^{B11a}$ to $R^{B11d}$ and $R^{B12a}$ to $R^{B12d}$ represent methyl groups.

$R^{B13a}$ to $R^{B13d}$ each represent preferably a hydrogen atom, or an alkyl group having 1 or more and 5 or less carbon atoms, more preferably a hydrogen atom, or an alkyl group having 1 or more and 3 or less carbon atoms, still more preferably a hydrogen atom. It is still further more preferred that all of $R^{B13a}$ to $R^{B13d}$ represent hydrogen atoms.

m1 to m4 each represent preferably 0 or more and 3 or less, more preferably 0 or more and 1 or less, still more preferably 0. $Z^1$ to $Z^4$ each preferably represent a carbon atom, and it is more preferred that all of $Z^1$ to $Z^4$ represent carbon atoms.

Among the compounds (B1), bis(2,4-dicumylphenyl)pentaerythritol diphosphite represented by the following formula (B11) is particularly suitable because the compound can impart long-term moist heat resistance and long-term heat resistance to the polycarbonate resin composition, and is easily available. The compound is available as a commercial product, and for example, "Doverphos S-9228PC" manufactured by Dover Chemical Corporation may be used.

(B11)

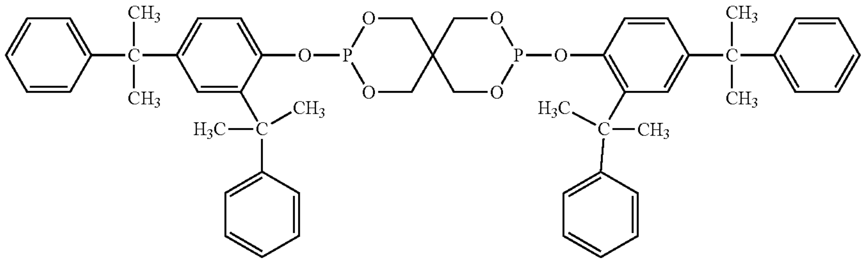

The content of the component (B1) in the polycarbonate resin composition is 0.01 part by mass or more, preferably 0.015 part by mass or more, more preferably 0.02 part by mass or more with respect to 100 parts by mass of the component (A), and is 0.08 part by mass or less, preferably 0.07 part by mass or less, more preferably 0.06 part by mass or less, still more preferably 0.05 part by mass or less with respect thereto. When the content of the component (B1) is less than 0.01 part by mass with respect to 100 parts by mass of the component (A), improving effects on the long-term moist heat resistance and long-term heat resistance of the composition are not sufficient. In addition, when the content is more than 0.08 part by mass, the initial YI value thereof in a short optical path length tends to increase. The above-mentioned components (B1) may be used alone or in combination thereof. When the plurality of kinds of components (B1) are incorporated, their total amount falls within the above-mentioned ranges.

Compound (B2) Represented by Formula (B2)

The polycarbonate resin composition of the present invention preferably includes the compound (B2) represented by the following formula (B2) (hereinafter sometimes referred to as "compound (B2)" or "component (B2)") from the viewpoint of obtaining a molded body that achieves both of excellent performance in terms of initial color tone in a short optical path length and excellent performance in terms of LED irradiation resistance.

(B2)

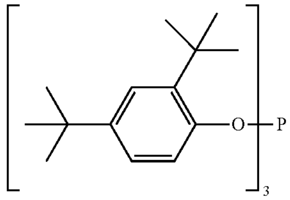

The compound (B2) is (tris(2,4-di-tert-butylphenyl)phosphite). The compound is available as a commercial product, and for example, "Irgafos 168" manufactured by BASF Japan Ltd. may be used.

When the component (B2) is incorporated, the content of the component (B2) in the polycarbonate resin composition is preferably more than 0 parts by mass, more preferably 0.001 part by mass or more, still more preferably 0.005 part by mass or more, still further more preferably 0.008 part by mass or more, still further more preferably 0.01 part by mass or more with respect to 100 parts by mass of the component (A), and is preferably 0.25 part by mass or less, more preferably 0.20 part by mass or less, still more preferably 0.15 part by mass or less with respect thereto. When the content of the component (B2) is more than 0 parts by mass and 0.25 part by mass or less, a molded body excellent in light fastness and LED irradiation resistance is obtained.

The total content of the components (B1) and (B2) in the polycarbonate resin composition is preferably 0.01 part by mass or more, more preferably 0.015 part by mass or more, still more preferably 0.02 part by mass or more with respect to 100 parts by mass of the component (A), and is preferably 0.3 part by mass or less, more preferably 0.25 part by mass or less, still more preferably 0.1 part by mass or less with respect thereto. When the total content of the components (B1) and (B2) is 0.01 part by mass or more, a molded body excellent in initial color tone in a short optical path length, long-term heat resistance, long-term moist heat resistance, and LED irradiation resistance is obtained. In addition, when the total content of the components (B1) and (B2) is 0.3 part by mass or less, a molded body excellent in light fastness and LED irradiation resistance is obtained.

The component (B2) is a component that may be optionally incorporated, and the total content of the components (B1) and (B2) when the component (B2) is not incorporated into the polycarbonate resin composition means the content of the component (B1) in the polycarbonate resin composition.

Phenol-Based Antioxidant (C)

The polycarbonate resin composition of the present invention includes the phenol-based antioxidant (C) (hereinafter sometimes referred to as "component (C)") for improving the long-term moist heat resistance, long-term heat resistance, and LED irradiation resistance of a molded body to be obtained. In the case where the polycarbonate resin composition of the present invention includes the phenol-based antioxidant (C), even when the molded body obtained from the composition is subjected to long-term endurance tests under a high-temperature and high-humidity condition, and under a high-temperature condition, the molded body shows little yellowing, and hence can maintain a satisfactory color tone. Further, a molded body, which hardly deteriorates even when irradiated with light from a LED for a long time period and is hence excellent in LED irradiation resistance, is obtained.

Examples of the phenol-based antioxidant (C) include: alkyl-3-(3,5-di-tert-butyl-4-hydroxyphenyl)propionates (the alkyl group is, for example, an alkyl group having 4 to 20 carbon atoms, and is preferably an alkyl group having 8 to 18 carbon atoms), such as n-octyl-3-(3,5-di-t-butyl-4-hydroxyphenyl)propionate, 6-methylheptyl-3-(3,5-di-tert-butyl-4-hydroxyphenyl)propionate, and n-octadecyl-3-(3,5-di-tert-butyl-4-hydroxyphenyl)propionate; 2,6-di-tert-butyl-4-alkylphenols (the alkyl group is, for example, an alkyl group having 1 to 4 carbon atoms), such as 2,6-di-tert-butyl-4-methylphenol and 2,6-di-tert-butyl-4-ethylphenol; and 2,4-dimethyl-6-tert-butylphenol and 2,6-di-tert-amyl-p-cresol. Among them, 2,6-di-tert-butyl-4-alkylphenols are preferred, and 2,6-di-tert-butyl-4-methylphenol is more preferred. The compound is available as a commercial product, and for example, "Irganox 1076" manufactured by BASF Japan Ltd. may be used.

The content of the component (C) in the polycarbonate resin composition is 0.005 part by mass or more, preferably 0.01 part by mass or more, more preferably 0.02 part by mass or more with respect to 100 parts by mass of the component (A), and is 0.15 part by mass or less, preferably 0.14 part by mass or less, more preferably 0.12 part by mass or less with respect thereto. When the content of the component (C) is 0.005 part by mass or more, a molded body, which hardly deteriorates even when irradiated with light from a LED for a long time period and is hence excellent in LED irradiation resistance, is obtained. In addition, when the content of the component (C) is 0.15 part by mass or less, both of excellent performance in terms of initial color tone and long-term heat resistance, and excellent performance in terms of LED irradiation resistance can be achieved. The above-mentioned components (C) may be used alone or in combination thereof. When the plurality of kinds of components (C) are incorporated, their total amount falls within the above-mentioned ranges.

Alicyclic Epoxy Compound (D)

The polycarbonate resin composition of the present invention includes the alicyclic epoxy compound (D) (hereinafter sometimes referred to as "component (D)") for improving both the long-term moist heat resistance and long-term heat resistance of a molded body to be obtained. In the case where the polycarbonate resin composition of the present invention includes the alicyclic epoxy compound (D), even when the molded body obtained from the composition is subjected to long-term endurance tests under a high-temperature and high-humidity condition, and under a high-temperature condition, the molded body shows little yellowing, and hence can maintain a satisfactory color tone. Further, a molded body, which hardly deteriorates even when irradiated with light from a LED or the like for a long time period and is hence excellent in LED irradiation resistance, is obtained.

The alicyclic epoxy compound refers to a cyclic aliphatic compound having an alicyclic epoxy group, that is, an epoxy group obtained by adding one oxygen atom to an ethylene bond in an aliphatic ring, and specifically, compounds represented by the following formulae (D1) to (D13) are each suitably used:

(D1)

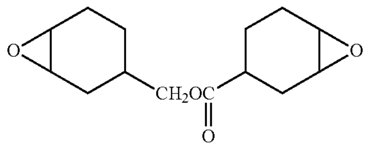

(D2)

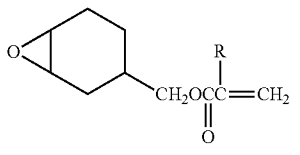

wherein R represents H or $CH_3$;

(D3)

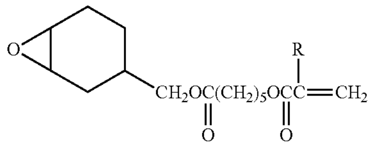

wherein R represents H or $CH_3$;

(D4)

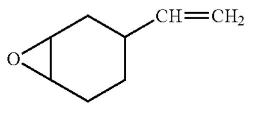

-continued (D5)

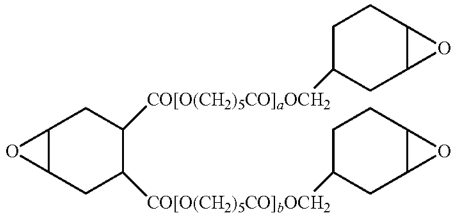

wherein "a"+"b" is equal to 1 or 2;

(D6)

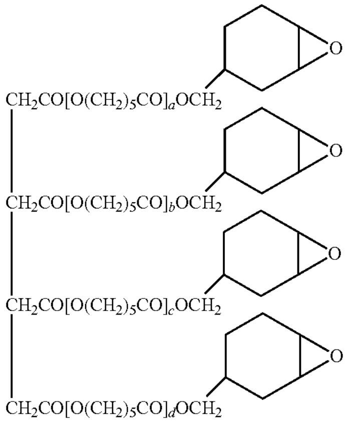

wherein "a"+"b"+"c"+"d" is equal to 1 or more and 3 or less;

(D7)

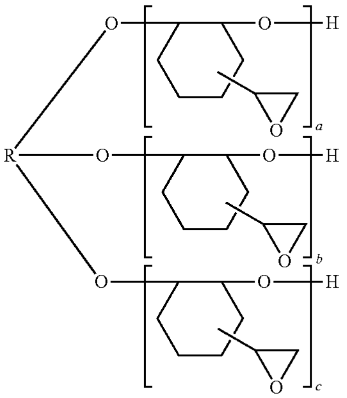

wherein "a"+"b"+"c" is equal to "n" (integer), and R represents a hydrocarbon group;

(D8)

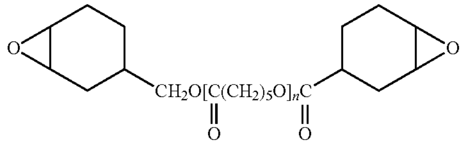

wherein "n" represents an integer;

(D9)

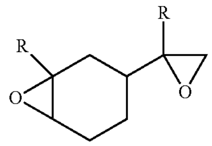

wherein R represents a hydrocarbon group;

(D10)

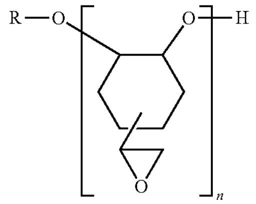

wherein "n" represents an integer, and R represents a hydrocarbon group.

(D11)

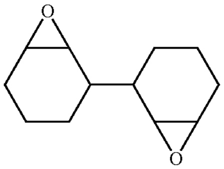

(D12)

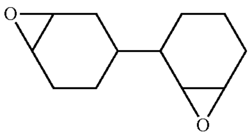

(D13)

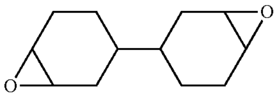

Among the above-mentioned alicyclic epoxy compounds, one or more kinds of compounds selected from the group consisting of the compounds represented by the formula (D1), the formula (D7), and the formula (D10) to the formula (D13) are preferred because each of the compounds is excellent in compatibility with the aromatic polycarbonate resin (A), and hence does not impair the transparency of the polycarbonate resin composition, one or more kinds of compounds selected from the group consisting of the compounds represented by the formula (D1) and the formula (D10) to the formula (D13) are more preferred, and the compound represented by the formula (D1) is still more preferred. For example, the compound represented by the formula (D1) is available as 3',4'-epoxycyclohexylmethyl-3,4-epoxycyclohexane carboxylate ("CELLOXIDE 2021P" manufactured by Daicel Corporation). In addition, the compound represented by the formula (D10) is available as a 1,2-epoxy-4-(2-oxiranyl)cyclohexane adduct of 2,2-bis(hydroxymethyl)-1-butanol ("EHPE 3150" manufactured by Daicel Corporation).

In addition, "EHPE 3150CE" commercially available as a mixture of CELLOXIDE 2021P and EHPE 3150 from Daicel Corporation may also be preferably used.

In addition, the compounds represented by the formula (D11) to the formula (D13) are available as bi-7-oxabicyclo [4.1.0]heptane ("CELLOXIDE 8010" manufactured by Daicel Corporation) that is a mixture of the compounds.

The content of the component (D) in the polycarbonate resin composition is 0.005 part by mass or more, preferably 0.01 part by mass or more, more preferably 0.02 part by mass or more with respect to 100 parts by mass of the component (A), and is 0.2 part by mass or less, preferably 0.18 part by mass or less, more preferably 0.15 part by mass or less with respect thereto. When the content of the component (D) in the polycarbonate resin composition is less than 0.005 part by mass with respect to 100 parts by mass of the component (A), improving effects on the long-term moist heat resistance and long-term heat resistance of the composition are not sufficient. When the content is more than 0.2 part by mass, the improving effects on the long-term moist heat resistance and the long-term heat resistance are saturated. The above-mentioned components (D) may be used alone or in combination thereof. When the plurality of kinds of components (D) are incorporated, their total amount falls within the above-mentioned ranges.

UV Absorber (E)

The polycarbonate resin composition of the present invention may further include the UV absorber (E) (hereinafter sometimes referred to as "component (E)") for improving its light fastness.

Examples of the UV absorber (E) include a benzoxazinone-based compound, a benzotriazole-based compound, a salicylate-based compound, a malonic acid ester-based compound, an oxalylaramid-based compound, a triazine-based compound, a benzophenone-based compound, and a cyanoacrylate-based compound. Those UV absorbers may be used alone or in combination thereof.

An example of the benzoxazinone-based compound may be a compound represented by the following formula (E1):

(E1)

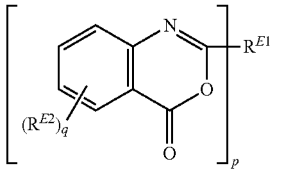

wherein in the formula (E1), $R^{E1}$ represents a residue obtained by removing "p" hydrogen atoms from an aromatic compound having one or two aromatic rings in a molecule thereof, $R^{E2}$ represents a hydrogen atom, a halogen atom, a nitro group, an alkyl group having 1 or more and 8 or less carbon atoms, an alkoxy group having 1 or more and 8 or less carbon atoms, or an alkenyloxy group having 2 or more and 8 or less carbon atoms, "p" represents 2 or 3, and "q" represents an integer of 1 or more and 4 or less.

In the formula (E1), examples of $R^{E1}$ include a phenylene group, a biphenylene group, and a naphthylene group, and a phenylene group is preferred.

As $R^{E2}$, examples of the alkyl group having 1 or more and 8 or less carbon atoms may include alkyl groups, such as a methyl group, an ethyl group, a propyl group, and a butyl group. Examples of the alkoxy group having 1 or more and 8 or less carbon atoms may include a methoxy group, an ethoxy group, a propoxy group, and a butoxy group. Examples of the alkenyloxy group having 2 or more and 8 or less carbon atoms may include an allyloxy group, a 2-propenyloxy group, a 2-butenyloxy group, and a 2-methyl-3-propenyloxy group. $R^{E2}$ preferably represents a hydrogen atom. "p" represents 2 or 3, preferably 2.

Among the compounds each represented by the formula (E1), a bisbenzoxazinone compound is preferred, and 2,2'-(1,4-phenylene)bis[4H-3,1-benzoxazin-4-one] represented by the following formula (E11) is more preferred.

(E11)

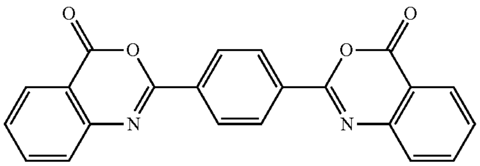

Examples of the benzotriazole-based compound include 2-(2'-hydroxy-5'-methylphenyl)benzotriazole, 2-(2'-hydroxy-5'-t-butylphenyl)benzotriazole, 2-(2'-hydroxy-5'-t-octylphenyl)benzotriazole, 2-(2'-hydroxy-3',5'-di-t-butylphenyl)benzotriazole, 2-(2'-hydroxy-3',5'-di-amylphenyl) benzotriazole, 2-(2'-hydroxy-3'-dodecyl-5'-methylphenyl) benzotriazole, 2-(2'-hydroxy-3',5'-dicumylphenyl) benzotriazole, and 2,2'-methylenebis[4-(1,1,3,3-tetramethylbutyl)-6-(2H-benzotriazol-2-yl)phenol].

Examples of the salicylate-based compound include phenyl salicylate, p-t-butylphenyl salicylate, and p-octylphenyl salicylate. Examples of the malonic acid ester-based compound include benzylidene bis(diethyl malonate) and 4-methoxyphenyl-methylene-dimethyl ester. An example of the oxalylaramid-based compound is an oxalylaramid compound with a hydrocarbon group having 1 or more and 12 or less carbon atoms.

The above-mentioned compounds may be used alone or in combination thereof.

Among them, as the UV absorber (E), the benzoxazinone-based compound is preferred, the bisbenzoxazinone compound is more preferred, and 2,2'-(1,4-phenylene)bis[4H-3,1-benzoxazin-4-one] represented by the formula (E11) is still more preferred.

The content of the component (E) in the polycarbonate resin composition is 0.1 part by mass or more with respect to 100 parts by mass of the component (A), and is 0.4 part by mass or less, preferably 0.3 part by mass or less, more preferably 0.2 part by mass or less, still more preferably 0.15 part by mass or less with respect thereto from the viewpoints of an improvement in light fastness and economical efficiency. The above-mentioned components (E) may be used alone or in combination thereof. When the plurality of kinds of components (E) are incorporated, their total amount falls within the above-mentioned ranges.

Component (F): Polyether Compound (F)

The polycarbonate resin composition of the present invention may further include the polyether compound (F) (hereinafter sometimes referred to as "component (F)") for improving its initial color tone in a short optical path length, its long-term heat resistance, and its LED irradiation resistance. Examples of the polyether compound include compounds each having a polyoxyalkylene structure in a molecule thereof such as polyether polyol.

The polyether compound (F) having a polyoxyalkylene structure is, for example, a polyether compound represented by the following formula (F1):

$$R^{F3}O—(R^{F1}O)_m\text{-A-}(R^{F2}O)_n—R^{F4} \qquad \text{(F1)}$$

wherein $R^{F1}$ and $R^{F2}$ each represent an alkylene group having 1 or more carbon atoms, and $R^{F1}$ and $R^{F2}$ may be identical to or different from each other, m+n is 5 or more and less than 300, and when "m" represents 2 or more, $R^{F1}$s may be identical to or different from each other, and when "n" represents 2 or more, $R^{F2}$s may be identical to or different from each other, $R^{F3}$ and $R^{F4}$ each represent a hydrogen atom, a hydrocarbon group having 1 to 30 carbon atoms, an alkanoyl group having 1 to 30 carbon atoms, an alkenoyl group having 2 to 30 carbon atoms, or a glycidyl group, and $R^{F3}$ and $R^{F4}$ may be identical to or different from each other, and A represents a single bond or a divalent organic group.

The number of carbon atoms in the alkylene group represented by each of $R^{F1}$ and $R^{F2}$ is preferably from 1 to 8, more preferably from 1 to 6, still more preferably from 1 to 5, most preferably from 2 to 5. Examples of the alkylene group represented by each of $R^{F1}$ and $R^{F2}$ may include a methylene group, an ethylene group, a trimethylene group, a propylene group, a tetramethylene group, and a hexamethylene group.

The polyoxyalkylene group represented by $(R^{F1}O)_m$ is not limited to a group having a single oxyalkylene unit as a repeating unit, such as a polyoxyethylene group or a polyoxypropylene group, and may be a group having as repeating units a plurality of oxyalkylene units different from each other in number of carbon atoms, such as an oxyethylene unit and an oxypropylene unit.

The polyoxyalkylene group represented by $(R^{F2}O)_n$ is not limited to a group having a single oxyalkylene unit as a repeating unit, such as a polyoxyethylene group or a polyoxypropylene group, and may be a group having as repeating units a plurality of oxyalkylene units different from each other in number of carbon atoms, such as an oxyethylene unit and an oxypropylene unit.

Examples of the monovalent hydrocarbon group having 1 to 30 carbon atoms that is represented by each of $R^{F3}$ and $R^{F4}$ include an alkyl group having 1 to 30 carbon atoms, an alkenyl group having 2 to 30 carbon atoms, an aryl group having 6 to 30 carbon atoms, and an aralkyl group having 7 to 30 carbon atoms.

The alkyl group and the alkenyl group may be linear, branched, or cyclic, and examples thereof include a methyl group, an ethyl group, a n-propyl group, an isopropyl group, various butyl groups, various pentyl groups, various hexyl groups, various octyl groups, a cyclopentyl group, a cyclohexyl group, an allyl group, a propenyl group, various butenyl groups, various hexenyl groups, various octenyl groups, a cyclopentenyl group, and a cyclohexenyl group. Examples of the aryl group include a phenyl group, a tolyl group, and a xylyl group. Examples of the aralkyl group include a benzyl group, a phenethyl group, and a methylbenzyl group.

An example of the divalent organic group represented by A is a divalent group represented by the following formula (a).

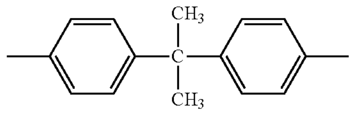

(a)

The alkanoyl group having 1 to 30 carbon atoms that is represented by each of $R^{F3}$ and $R^{F4}$ may be linear or branched, and examples thereof include a methanoyl group, an ethanoyl group, a n-propanoyl group, an isopropanoyl group, a n-butanoyl group, a t-butanoyl group, a n-hexanoyl group, a n-octanoyl group, a n-decanoyl group, a n-dodecanoyl group, and a benzoyl group. Among them, an alkanoyl group having 1 to 20 carbon atoms is preferred from the viewpoints of compatibility, thermal stability, and ease of production.

The alkenoyl group having 2 to 30 carbon atoms that is represented by each of $R^{F3}$ and $R^{F4}$ may be linear or branched, and examples thereof include an ethenoyl group, a n-propenoyl group, an isopropenoyl group, a n-butenoyl group, a t-butenoyl group, a n-hexenoyl group, a n-octenoyl group, a n-decenoyl group, and a n-dodecenoyl group. Among them, from the viewpoint of reducing the molecular weight, the viewpoint of compatibility or solubility, and the viewpoint of ease of production, an alkenoyl group having 2 to 10 carbon atoms is preferred, and an alkenoyl group having 2 to 6 carbon atoms is more preferred.

The polyether compound represented by the formula (F1) is preferably a polyoxyalkylene glycol represented by the formula (F1) in which $R^{F1}$ and $R^{F2}$ each represent an alkylene group having 2 to 5 carbon atoms, and $R^{F3}$ and $R^{F4}$ each represent a hydrogen atom.

In addition, specific examples of the polyether compound represented by the formula (F1) include polyethylene glycol, polypropylene glycol, polytetramethylene glycol, polyoxyethylene polyoxypropylene glycol, polyoxyethylene polyoxytetramethylene glycol, polyoxypropylene polyoxytetramethylene glycol, polyoxyethylene monomethyl ether, polyoxyethylene dimethyl ether, polyoxyethylene-bisphenol A ether, polyoxypropylene-bisphenol A ether, polyoxyethylene-polyoxypropylene-bisphenol A ether, polyethylene glycol-allyl ether, polyethylene glycol-diallyl ether, polypropylene glycol-allyl ether, polypropylene glycol-diallyl ether, polyethylene glycol-polypropylene glycol-allyl ether, polyethylene glycol dimethacrylate, polypropylene glycol dimethacrylate, and polypropylene glycol distearate.

Those compounds are available as commercial products, and for example, "UNIOX (trademark)", "UNIOL (trademark)", "UNILUBE (trademark)", "UNISAFE (trademark)", "POLYCERIN (trademark)", or "EPIOL (trademark)" manufactured by NOF Corporation may be used.

Among them, a "UNILUBE DE" series of a random copolymerization type of polyoxyethylene glycol and polyoxypropylene glycol, a "POLYCERIN DC" series of a random copolymerization type of polyoxyethylene glycol and polyoxytetramethylene glycol, and a "POLYCERIN DCB" series of a random copolymerization type of polyoxypropylene glycol and polyoxytetramethylene glycol, the series each having a molecular weight of 1,000 or more and 5,000 or less, are particularly preferred.

The number-average molecular weight (Mn) of the polyether compound (F) is not particularly limited, but is preferably 200 or more and 10,000 or less, more preferably 500 or more and 8,000 or less, still more preferably 1,000 or more and 5,000 or less.

When the component (F) is used, the content of the component (F) in the polycarbonate resin composition is preferably more than 0 parts by mass, more preferably 0.001 part by mass or more, still more preferably 0.01 part by mass or more, still further more preferably 0.05 part by mass or more with respect to 100 parts by mass of the aromatic polycarbonate resin (A), and is preferably 0.4 part by mass or less, more preferably 0.35 part by mass or less, still more preferably 0.30 part by mass or less with respect thereto from the viewpoint of obtaining a polycarbonate resin composition satisfactory in terms of initial color tone in a short optical path length, long-term heat resistance, and LED irradiation resistance. When the content of the component (F) in the polycarbonate resin composition is 0.4 part by mass or less with respect to 100 parts by mass of the component (A), an excellent initial haze to be required in a lens for LED lighting can be maintained. The above-mentioned components (F) may be used alone or in combination thereof. When the plurality of kinds of components (F) are incorporated, their total amount falls within the above-mentioned ranges.

Release Agent (G)

The polycarbonate resin composition of the present invention may further include the release agent (G) (hereinafter sometimes referred to as "component (G)").

An example of the release agent may be a fatty acid ester (G1). The fatty acid ester (G1) is a condensate of an aliphatic carboxylic acid and an alcohol.

Examples of the aliphatic carboxylic acid include saturated or unsaturated aliphatic monocarboxylic acids, aliphatic dicarboxylic acids, aliphatic tricarboxylic acids, and aliphatic tetracarboxylic acids. Among them, one or more kinds selected from the group consisting of aliphatic monocarboxylic acids and aliphatic dicarboxylic acids are preferred, and aliphatic monocarboxylic acids are more preferred. The aliphatic carboxylic acid may be a chain aliphatic carboxylic acid or a cyclic aliphatic carboxylic acid, but is preferably a chain aliphatic carboxylic acid. The aliphatic carboxylic acid has preferably 6 or more and 40 or less carbon atoms, more preferably 8 or more and 32 or less carbon atoms, still more preferably 12 or more and 24 or less carbon atoms.

Examples of the saturated aliphatic carboxylic acids include: saturated aliphatic monocarboxylic acids, such as capric acid, neodecanoic acid, lauric acid, myristic acid, palmitic acid, stearic acid, arachidic acid, behenic acid, and lignoceric acid; and saturated aliphatic dicarboxylic acids, such as adipic acid, azelaic acid, and sebacic acid. Examples of the unsaturated aliphatic carboxylic acids include undecylenic acid, oleic acid, elaidic acid, erucic acid, nervonic acid, linoleic acid, ricinoleic acid, γ-linolenic acid, arachidonic acid, α-linolenic acid, stearidonic acid, eicosapentaenoic acid, and docosahexaenoic acid.

Among them, as the aliphatic carboxylic acid, one or more kinds selected from the group consisting of lauric acid, myristic acid, palmitic acid, stearic acid, and behenic acid are preferred, one or more kinds selected from the group consisting of palmitic acid, stearic acid, and behenic acid are more preferred, and stearic acid is still more preferred.

As the alcohol, an aliphatic alcohol is preferred, and a saturated aliphatic alcohol is more preferred. The saturated aliphatic alcohol may be a saturated chain aliphatic alcohol or a saturated cyclic aliphatic alcohol, but is preferably a saturated chain aliphatic alcohol. Those alcohols may each be a monohydric alcohol or a polyhydric alcohol. In addition, the alcohol may have a substituent, such as a fluorine atom, a chlorine atom, a bromine atom, or an aryl group.

The alcohol has preferably 1 or more and 30 or less carbon atoms, more preferably 2 or more and 24 or less carbon atoms.

Specific examples of the alcohol include octanol, decanol, dodecanol, tetradecanol, stearyl alcohol, behenyl alcohol, ethylene glycol, diethylene glycol, glycerin, pentaerythritol, 2,2-dihydroxyperfluoropropanol, neopentylene glycol, ditrimethylolpropane, and dipentaerythritol.

Examples of the fatty acid ester (G1) include behenyl behenate, octyldodecyl behenate, stearyl stearate, glycerin monopalmitate, glycerin monostearate, glycerin monooleate, glycerin distearate, glycerin tristearate, pentaerythritol monopalmitate, pentaerythritol monostearate, pentaerythritol distearate, pentaerythritol tristearate, and pentaerythritol tetrastearate. Those fatty acid esters may be used alone or in combination thereof.

Among them, as the fatty acid ester (G1), stearates are preferred, and glycerin monostearate is more preferred.

When the component (G) is used, the content of the component (G) in the polycarbonate resin composition is preferably 0.005 part by mass or more, more preferably 0.01 part by mass or more with respect to 100 parts by mass of the component (A), and is preferably 0.1 part by mass or less with respect thereto. When the content of the component (G) is 0.005 part by mass or more with respect to 100 parts by mass of the component (A), a releasability-improving effect is satisfactory, and when the content is 0.1 part by mass or less, the long-term heat resistance is satisfactory. The above-mentioned components (G) may be used alone or in combination thereof. When the plurality of kinds of components (G) are incorporated, their total amount falls within the above-mentioned ranges.

Other Additive

In addition to the above-mentioned respective components, an optional additive may be appropriately added to the polycarbonate resin composition of the present invention. Examples of the optional additive include an organophosphorus compound (H) (hereinafter sometimes referred to as "compound (H)" or "component (H)") except the compounds (B1), (B2), (Z1), and (Z2), and polyorganosiloxane.

Examples of the compound (H) include a pentaerythritol diphosphite compound (H1) represented by the following formula (H1) and an arylphosphine (H2) represented by the following formula (H2). The compounds may be used alone or in combination thereof.

(H1)

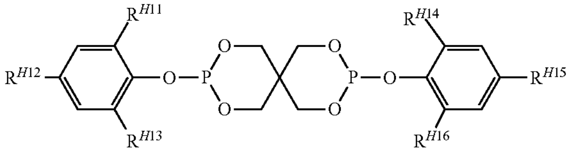

In the formula (H1), $R^{H11}$ to $R^{H16}$ each represent a hydrogen atom, or an alkyl group having 1 or more and 12 or less carbon atoms, and may be identical to or different from each other, provided that not all of $R^{H11}$ to $R^{H16}$ represent hydrogen atoms. In addition, when both of $R^{H12}$ and $R^{H15}$ represent methyl groups, not all of $R^{H11}$, $R^{H13}$, $R^{H14}$, and $R^{H16}$ represent tent-butyl groups:

$$P—(R^{H21})_3 \quad \text{(H2)}$$

wherein in the formula (H2), $R^{H21}$s each represent a hydrocarbon group that may have a substituent, and at least one of $R^{H21}$s represents an aryl group having 6 or more and 18 or less carbon atoms, and the plurality of $R^{H21}$s may be identical to or different from each other, provided that not all of $R^{H21}$s represent phenyl groups.

Examples of the arylphosphine (H2) include diphenylbutylphosphine, diphenyloctadecylphosphine, tris(p-tolyl) phosphine, tris(p-nonylphenyl)phosphine, tris(naphthyl) phosphine, diphenyl(hydroxymethyl)phosphine, diphenyl (acetoxymethyl)phosphine, diphenyl(β-ethylcarboxyethyl) phosphine, tris(p-chlorophenyl)phosphine, tris(p-fluorophenyl)phosphine, diphenylbenzylphosphine, diphenyl-β-cyanoethylphosphine, diphenyl(p-hydroxyphenyl)phosphine, diphenyl-1,4-dihydroxyphenyl-2-phosphine, and phenylnaphthylbenzylphosphine. Those compounds may be used alone or in combination thereof.

When the compound (H) is used, the content of the compound (H) in the polycarbonate resin composition is preferably 0.01 part by mass or more with respect to 100 parts by mass of the component (A), and is preferably 0.05 part by mass or less, more preferably 0.04 part by mass or less with respect thereto from the viewpoints of long-term moist heat resistance and long-term heat resistance.

The polyorganosiloxane is preferably a compound having one or more kinds of functional groups, such as an alkoxy group, an aryloxy group, a polyoxyalkylene group, a carboxyl group, a silanol group, an amino group, a mercapto group, an epoxy group, and a vinyl group.

The kinematic viscosity of the polyorganosiloxane at 25° C. is preferably 10 $mm^2/s$ or more from the viewpoint of a lubricating effect serving as the releasability, and is preferably 200 $mm^2/s$ or less from the viewpoint of its dispersibility in the polycarbonate resin. From the viewpoints, the kinematic viscosity of the polyorganosiloxane falls within the range of more preferably 20 $mm^2/s$ or more and 150 $mm^2/s$ or less, still more preferably 40 $mm^2/s$ or more and 120 $mm^2/s$ or less.

A difference between the refractive index of the polyorganosiloxane and the refractive index of the polycarbonate is preferably made as small as possible in order that the transparency of the polycarbonate may not be reduced at the addition of the polyorganosiloxane thereto. The refractive index of the polyorganosiloxane is preferably 1.45 or more, more preferably 1.50 or more because the refractive index of the polycarbonate is 1.58.

When the polyorganosiloxane is used, the addition amount thereof is preferably 0.01 part by mass or more, more preferably 0.02 part by mass or more, still more preferably 0.05 part by mass or more with respect to 100 parts by mass of the aromatic polycarbonate resin (A), and is preferably 0.15 part by mass or less, more preferably 0.1 part by mass or less with respect thereto. When the addition amount falls within the above-mentioned ranges, the releasability can be improved. Further, even under a continuous molding condition, the amount of a mold deposit can be significantly reduced.

The polycarbonate resin composition of the present invention is preferably free of any absorption maximum in the wavelength range of from 500 nm to 600 nm from the viewpoint of achieving both of excellent performance in terms of initial color tone in a short optical path length and excellent performance in terms of LED irradiation resistance. The presence of even an extremely trace amount of a bluing agent in the polycarbonate resin composition typically causes the composition to have an absorption maximum in the wavelength range of from 500 nm to 600 nm. Although the blending of the bluing agent can offset the yellow coloring of the composition to adjust the YI value of the molded body obtained therefrom, in the present invention, both of the excellent performance in terms of initial color tone in a short optical path length and the excellent performance in terms of LED irradiation resistance can be achieved even when such bluing agent is not blended.

In the present invention, the phrase "free of any absorption maximum in the wavelength range of from 500 nm to 600 nm" means that when 6 g of an aromatic polycarbonate resin molded body obtained by molding the polycarbonate resin composition of the present invention is dissolved in 50 mL of methylene chloride, and the absorption spectrum of the solution is measured with a quartz cell having an optical path length of 5 cm in a UV-visible spectrophotometer by a transmission method, no absorption maximum is present in the wavelength range of from 500 nm to 600 nm. In the present invention, it is preferred that no absorption other than absorption derived from the aromatic polycarbonate resin be present in the wavelength range of from 500 nm to 600 nm.

Method of Producing Polycarbonate Resin Composition

A method of producing the polycarbonate resin composition of the present invention is not particularly limited. The polycarbonate resin composition may be produced, for example, by mixing the components (A), (B1), and (C) to (E), and as required, the components (B2), (F), and (G) and any other additive, and melting and kneading the mixture. The melting and kneading may be performed by a typically used method, for example, a method using a single-screw extruder, a double-screw extruder, a co-kneader, a multiple-screw extruder, or the like. In normal cases, a heating temperature at the time of the melting and kneading is appropriately selected from the range of from 220° C. to 300° C.

Molded Body

A molded body of the present invention includes the polycarbonate resin composition of the present invention described above. The molded body may be produced through the use of a melt-kneaded product of the polycarbonate resin composition or a pellet thereof obtained through melting and kneading as a raw material by an injection molding method, an injection compression molding method, an extrusion molding method, a profile extrusion molding method, a blow molding method, a press molding method, a vacuum molding method, an expansion molding method, or the like. In particular, the molded body is preferably produced through the use of the resultant pellet by an injection molding method or an injection compression molding method. Although a molding temperature is not particularly limited, for example, the composition may be molded at a temperature of 240° C. or more and 300° C. or less, preferably 280° C. or more and 300° C. or less.

The molded body of the present invention has a satisfactory initial color tone, and is excellent in high durability (moist heat resistance, heat resistance, light fastness, and LED irradiation resistance). Accordingly, to make use of the advantages, the molded body is preferably a member for LED lighting, more preferably a lens part for LED lighting.

EXAMPLES

The present invention is described more specifically by way of Examples below, but the present invention is not limited to these Examples.

Production Example 1 (Production of Branched PC1: 0.90 mol % of THPE)

Polycarbonate Oligomer Synthesis Step

Sodium dithionite was added in an amount of 2,000 ppm by mass with respect to bisphenol A (BPA) to be dissolved later to 5.6 wt % aqueous sodium hydroxide, and BPA was dissolved in the mixture so that the concentration of BPA became 13.5 wt %. Thus, a solution of BPA in aqueous sodium hydroxide was prepared.

Sodium dithionite was added in an amount of 2,000 ppm by mass with respect to 1,1,1-tris(4-hydroxyphenylethane) (THPE) to be dissolved later to 5.6 wt % aqueous sodium hydroxide, and THPE was dissolved in the mixture so that the concentration of THPE became 11.3 wt %. Thus, a solution of THPE in aqueous sodium hydroxide was prepared.

The solution of BPA in aqueous sodium hydroxide, the solution of THPE in aqueous sodium hydroxide, methylene chloride, and phosgene were continuously passed through a tubular reactor having an inner diameter of 6 mm and a tube length of 30 m at flow rates of 42 L/hr, 0.87 L/hr, 15 L/hr, and 4.0 kg/hr, respectively. The tubular reactor had a jacket portion and the temperature of the reaction liquid was kept at 40° C. or less by passing cooling water through the jacket.

The reaction liquid that had exited the tubular reactor was continuously introduced into a baffled vessel-type reactor provided with a sweptback blade and having an internal volume of 40 L. 2.8 L/hr of the solution of BPA in aqueous sodium hydroxide, 0.07 L/hr of 25 wt % aqueous sodium hydroxide, 17 L/hr of water, 0.69 L/hr of a 1 wt % aqueous solution of triethylamine, and 4.6 L/hr of a solution of p-tert-butylphenol (PTBP) in methylene chloride (concentration: 4.0 wt %) were further added to the reactor to perform a reaction.

An aqueous phase was separated and removed by continuously taking out the reaction liquid overflowing the vessel-type reactor and leaving the reaction liquid at rest. Then, a methylene chloride phase was collected.

The resultant polycarbonate oligomer had a concentration of 330 g/L and a chloroformate group concentration of 0.72 mol/L.

Step of Producing Branched PC1

15 L of the previously obtained polycarbonate oligomer solution, 10.2 L of methylene chloride, and 2.8 mL of triethylamine were loaded into a 50-liter vessel-type reactor including a baffle board, a paddle-type stirring blade, and a cooling jacket, and were mixed with each other.

A solution of BPA in aqueous sodium hydroxide (prepared by dissolving 1,166 g of BPA in an aqueous solution prepared by dissolving 639 g of NaOH and 2.3 g of sodium dithionite in 9.3 L of water) was added to the mixed liquid to perform a polymerization reaction for 60 minutes.

10 L of methylene chloride was added to the resultant for dilution and the mixture was stirred for 10 minutes. After that, the mixture was separated into an organic phase containing a branched PC1, and an aqueous phase containing excess amounts of BPA and NaOH, and the organic phase was isolated.

The solution of the resultant branched PC1 in methylene chloride was sequentially washed with 0.03 mol/L aqueous sodium hydroxide and 0.2 N hydrochloric acid in amounts of 15 vol % each with respect to the solution. Next, the solution was repeatedly washed with pure water until an electric conductivity in an aqueous phase after the washing became 0.01 μS/m or less. The solution of the branched PC1 in methylene chloride obtained by the washing was concentrated and pulverized, and the flake was dried under reduced pressure at 120° C.

The branching ratio of the resultant branched PC1 determined by $^1$-H-NMR was 0.90 mol %, and the viscosity-average molecular weight Mv thereof measured in conformity with ISO 1628-4 (1999) was 22,800.

Measurement of Viscosity-Average Molecular Weight (Mv)

A viscosity-average molecular weight (Mv) was calculated from the following equation (Schnell's equation) after the determination of a limiting viscosity [η] through the measurement of the viscosity of a methylene chloride solution (concentration: g/L) at 20° C. with an Ubbelohde-type viscometer.

$$[\eta]=1.23\times10^{-5}\times Mv^{0.83}$$

Components used in Examples and Comparative Examples are as described below.

Aromatic Polycarbonate Resin (A)

(A1): "TARFLON FN1700" (manufactured by Formosa Idemitsu Petrochemical Corporation, bisphenol A polycarbonate resin, viscosity-average molecular weight (Mv)=17,700)

(A2): Branched PC1 (Production Example 1)

(A3): "TARFLON FN1200" (manufactured by Formosa Idemitsu Petrochemical Corporation, bisphenol A polycarbonate resin, viscosity-average molecular weight (Mv)=11,500)

(A4): "TARFLON FN2500" (manufactured by Formosa Idemitsu Petrochemical Corporation, bisphenol A polycarbonate resin, viscosity-average molecular weight (Mv)=23,500)

Phosphite-based Antioxidant (B)

(B1): "Doverphos S-9228PC" (manufactured by Dover Chemical Corporation, bis(2,4-dicumylphenyl)pentaerythritol diphosphite)

Compound (B2)

(B2): "Irgafos 168" (manufactured by BASF Japan Ltd., tris(2,4-di-tert-butylphenyl)phosphite)

Phenol-based Antioxidant (C)

(C1): "Irganox 1076" (manufactured by BASF Japan Ltd., n-octadecyl-3-(3,5-di-tert-butyl-4-hydroxyphenyl)propionate)

Alicyclic Epoxy Compound (D)

(D1): "CELLOXIDE 2021P" (manufactured by Daicel Corporation, 3',4'-epoxycyclohexylmethyl-3,4-epoxycyclohexanecarboxylate)

(D2): "CELLOXIDE 8010" (manufactured by Daicel Corporation, bi-7-oxabicyclo[4.1.0]heptane)

UV Absorber (E)

(E1): "CYASORB UV-3638F" (manufactured by Cytec Industries, 2,2'-(1,4-phenylene)bis[4H-3,1-benzoxazin-4-one])

Polyether Compound (F)

(F1): "UNILUBE 50DE-25" (manufactured by NOF Corporation, polyoxyethylene glycol-polyoxypropylene glycol)

Release Agent (G)

(G1): "S-100A" (manufactured by Riken Vitamin Co., Ltd., glycerin monostearate)

Others (Z1): "ADK STAB PEP-36" (manufactured by ADEKA Corporation, bis(2,6-di-tert-butyl-4-methylphenyl)pentaerythritol diphosphite)

(Z2): "JC-263" (manufactured by Johoku Chemical Co., Ltd, triphenylphosphine)

Examples 1 to 13 and Comparative Examples 1 to 10

In the respective examples, the respective components were blended at amount ratios shown in Table 1 to prepare polycarbonate resin compositions. The polycarbonate resin compositions were each melted and kneaded with a vented single-screw extruder having a screw diameter of 40 mm ("VS-40" manufactured by Tanabe Plastics Machinery Co., Ltd.) at a cylinder temperature of 250° C., and the melt-kneaded product was subjected to strand cutting to provide a pellet. The resultant pellet was dried at 110° C. for 5 hours, and then a molded body was produced and subjected to various evaluations by the following methods.

YI value of Molded Body

The pellet after the drying was molded into a flat plate-shaped test piece (molded body (1)) measuring 50 mm by 90 mm by 3 mm thick with an injection molding machine ("ES-1000" manufactured by Nissei Plastic Industrial Co., Ltd.) by an injection molding method at a cylinder temperature of 280° C. and a die temperature of 80° C. for a cycle time of 50 seconds.

The YI value (initial YI value: $YI_1$) of the resultant test piece was measured with a spectrophotometer ("U-4100" manufactured by Hitachi High-Technologies Corporation) under the conditions of a C light source and a two-degree field of view. The results are shown in Table. An acceptance criterion is as follows: the $YI_1$ is 1.35 or less.

Initial Haze Value of Molded Body

The haze value (initial haze value) of the flat plate-shaped test piece (molded body (1)) measuring 50 mm by 90 mm by 3 mm thick, which had been produced by the foregoing method, was measured with an ISO haze meter ("NDH-5000" manufactured by Nippon Denshoku Industries Co., Ltd.) under the following conditions: the diameter of a measurement light flux was 14 mmφ, the diameter of an integrating sphere incidence opening portion was 25 mmφ, and a 5 V/3 W white LED lamp was used as a lamp.

Heat Resistance Test of Molded Body

In addition, the flat plate-shaped test piece after the $YI_1$ measurement was loaded into a Geer oven ("GPS-222" manufactured by Tabai Espec Co., Ltd.) adjusted to a temperature of 140° C. for 1,000 hours. The YI value ($YI_2$) of the test piece after the test was measured in the same manner as that described above, and $\Delta YI(YI_2-YI_1)$ was determined. The results are shown in Table. The acceptance criterion of the heat resistance test is as follows: the $\Delta YI$ $(YI_2-YI_1)$ is 4.10 or less.

Moist Heat Resistance Test of Molded Body

The flat plate-shaped test piece after the $YI_1$ measurement was loaded into a thermohygrostat ("LH33-12P" manufactured by Nagano Science Co., Ltd.) set to a temperature of 85° C. and a relative humidity of 85% for 1,000 hours. The YI value ($YI_3$) of the test piece after the test was measured in the same manner as that described above, and $\Delta YI(YI_3-YI_1)$ was determined. The results are shown in Table. The acceptance criterion of the moist heat resistance test is as follows: the $\Delta YI(YI_3-YI_1)$ is 0.20 or less.

Light Fastness (UV Irradiation Resistance) Test of Molded Body

The flat plate-shaped test piece (molded body (1)) measuring 50 mm by 90 mm by 3 mm thick, which had been produced by the foregoing method, was exposed with a xenon weather meter ("Ci4000" manufactured by DJK Corporation) at a black panel temperature of 63° C. and a humidity of 50%RH without any rainfall cycle for 1,000 hours.

The YI value of the test piece after the exposure was measured with a spectrophotometer ("U-4100" manufactured by Hitachi, Ltd.) and a C2 light source. The results are shown in Table. The acceptance criterion of the light fastness test is as follows: the YI value is 5.25 or less.

LED Irradiation Resistance Test of Molded Body

The flat plate-shaped test piece (molded body (1)) measuring 50 mm by 90 mm by 3 mm thick produced by the foregoing method was irradiated with light from a LED for 500 hours under the following LED irradiation conditions in a thermostat at 100° C. In the LED irradiation, "OSW4XAHAE1E" manufactured by OptoSupply Limited was used as a LED chip.

LED Irradiation Conditions

LED power: 10 W (1 A×10 V)
LED irradiation intensity: 850 lm
LED irradiation distance: 1 mm After the LED irradiation, the LED irradiation portion of the surface of the flat plate-shaped test piece was subjected to FT-IR measurement under the following conditions.

FT-IR Measurement

Apparatus: A microscopic FT-IR apparatus (manufactured by Thermo Fisher Scientific K.K., model: Nicolet 8700 (IR irradiation portion), CONTINUUM (microscopic portion)).

Measurement method: An attenuated total reflection method (ATR)

Measurement wavenumber range: 650 $cm^{-1}$ to 4,000 $cm^{-1}$

Resolution: 4 $cm^{-1}$

Measurement conditions: An infrared ray is applied by using a germanium crystal at an incident angle of 29°.

Measurement range: A range measuring about 100 μm by about 100 μm at the center of the LED irradiation portion of the flat plate-shaped test piece (molded body (1))

Number of scans: 200 times

The ratio (peak intensity at a wavenumber of 1,686 $cm^{-1}$/peak intensity at a wavenumber of 1,776 $cm^{-1}$) of a peak intensity at a wavenumber of 1,686 $cm^{-1}$ to a peak intensity at a wavenumber of 1,776 $cm^{-1}$ when an absorbance at a wavenumber of 1,950 $cm^{-1}$ in the resultant FT-IR measurement chart in which an axis of ordinate indicated an absorbance and an axis of abscissa indicated a wavenumber was defined as a baseline was determined. The results are shown in Table. The acceptance criterion of the LED irradiation resistance test is as follows: the ratio determined in the foregoing is 0.50 or less.

TABLE 1

(1/2)

| | | | Example | | | | | | | |
|---|---|---|---|---|---|---|---|---|---|---|
| | | | 1 | 2 | 3 | 4 | 5 | 6 | 7 | 8 |
| Composition (part(s) by mass) | (A1) FN1700 | | | | | 100 | 100 | 100 | 100 | 100 |
| | (A2) Branched PC1 | | | | 50 | | | | | |
| | (A3) FN1200 | | | 100 | | | | | | |
| | (A4) FN2500 | | 100 | | 50 | | | | | |
| | (B1) Doverphos S-9228PC | | 0.02 | 0.03 | 0.06 | 0.02 | 0.04 | 0.04 | 0.04 | 0.04 |
| | (B2) IRGAFOS 168 | | | | | 0.07 | 0.01 | 0.01 | 0.01 | 0.01 |
| | (C1) IRGANOX 1076 | | 0.07 | 0.07 | 0.07 | 0.07 | 0.07 | 0.05 | 0.12 | 0.07 |
| | (D1) CELLOXIDE 2021P | | 0.10 | 0.10 | 0.10 | 0.10 | 0.10 | 0.10 | 0.10 | 0.03 |
| | (D2) CELLOXIDE 8010 | | | | | | | | | |
| | (E1) CYASORB UV-3638F | | 0.15 | 0.15 | 0.15 | 0.15 | 0.15 | 0.15 | 0.15 | 0.15 |
| | (F1) UNILUBE 50DE-25 | | | | | | | | | |
| | (G1) S-100A | | 0.03 | 0.03 | 0.03 | 0.03 | 0.03 | 0.03 | 0.03 | 0.03 |
| | (Z1) ADK STAB PEP-36 | | | | | | | | | |
| | (Z2) JC-263 | | | | | | | | | |
| Evaluation result | Initial YI value YI value after molding at 280° C. ($YI_1$) | | 1.34 | 1.32 | 1.22 | 1.22 | 1.21 | 1.21 | 1.2 | 1.18 |
| | Initial haze value After molding at 280° C. | | 0.57 | 0.62 | 0.52 | 0.52 | 0.57 | 0.58 | 0.50 | 0.59 |
| | Heat resistance | YI value after 1,000 hr of storage at 140° C. ($YI_2$) | 4.24 | 3.54 | 2.96 | 2.91 | 3.41 | 2.70 | 5.26 | 3.49 |
| | | $\Delta YI(YI_2 - YI_1)$ | 2.90 | 2.22 | 1.74 | 1.69 | 2.20 | 1.49 | 4.06 | 2.31 |
| | Moist heat resistance | YI value after 1,000 hr of storage at 85° C. and 85% RH ($YI_3$) | 1.31 | 1.25 | 1.21 | 1.29 | 1.21 | 1.31 | 1.33 | 1.38 |
| | | $\Delta YI(YI_3 - Y_1)$ | −0.03 | −0.07 | −0.01 | 0.07 | 0.00 | 0.10 | 0.13 | 0.20 |
| | Light fastness After 1,000 hr of UV irradiation | | 5.22 | 5.18 | 5.19 | 4.40 | 4.77 | 4.82 | 4.67 | 4.80 |
| | LED irradiation resistance Peak ratio after 1,000 hr of irradiation | | 0.30 | 0.38 | 0.40 | 0.40 | 0.30 | 0.31 | 0.27 | 0.43 |

(1/2)

| | | | Example | | | | |
|---|---|---|---|---|---|---|---|
| | | | 9 | 10 | 11 | 12 | 13 |
| Composition (part(s) by mass) | (A1) FN1700 | | 100 | 100 | 100 | 100 | 100 |
| | (A2) Branched PC1 | | | | | | |
| | (A3) FN1200 | | | | | | |
| | (A4) FN2500 | | | | | | |
| | (B1) Doverphos S-9228PC | | 0.04 | 0.05 | 0.05 | 0.05 | 0.05 |
| | (B2) IRGAFOS 168 | | 0.01 | 0.03 | 0.03 | 0.03 | 0.03 |
| | (C1) IRGANOX 1076 | | 0.07 | 0.07 | 0.07 | 0.07 | 0.07 |
| | (D1) CELLOXIDE 2021P | | 0.15 | 0.10 | 0.10 | | |
| | (D2) CELLOXIDE 8010 | | | | | 0.03 | 0.10 |
| | (E1) CYASORB UV-3638F | | 0.15 | 0.15 | 0.15 | 0.15 | 0.15 |
| | (F1) UNILUBE 50DE-25 | | | 0.1 | 0.3 | | |
| | (G1) S-100A | | 0.03 | 0.03 | 0.03 | 0.03 | 0.03 |
| | (Z1) ADK STAB PEP-36 | | | | | | |
| | (Z2) JC-263 | | | | | | |
| Evaluation result | Initial YI value YI value after molding at 280° C. ($YI_1$) | | 1.17 | 1.13 | 1.1 | 1.16 | 1.18 |
| | Initial haze value After molding at 280° C. | | 0.63 | 0.78 | 0.90 | 0.59 | 0.62 |
| | Heat resistance | YI value after 1,000 hr of storage at 140° C. ($YI_2$) | 3.38 | 2.96 | 3.13 | 3.52 | 2.70 |
| | | $\Delta YI(YI_2 - YI_1)$ | 2.21 | 1.83 | 2.03 | 2.36 | 1.52 |

TABLE 1-continued

| | | | | | | | |
|---|---|---|---|---|---|---|---|
| | Moist heat resistance | YI value after 1,000 hr of storage at 85° C. and 85% RH ($YI_3$) | 1.36 | 1.22 | 1.29 | 1.36 | 1.11 |
| | | $\Delta YI(YI_3 - Y_1)$ | 0.19 | 0.09 | 0.19 | 0.20 | −0.07 |
| | Light fastness After 1,000 hr of UV irradiation | | 4.81 | 4.43 | 4.19 | 4.80 | 4.67 |
| | LED irradiation resistance Peak ratio after 1,000 hr of irradiation | | 0.49 | 0.23 | 0.28 | 0.40 | 0.33 |

(2/2)

| | | | Comparative Example | | | | | | | | | |
|---|---|---|---|---|---|---|---|---|---|---|---|---|
| | | | 1 | 2 | 3 | 4 | 5 | 6 | 7 | 8 | 9 | 10 |
| Composition (part(s) by mass) | (A1) FN1700 | | | 100 | 100 | 100 | 100 | 100 | 100 | 100 | 100 | 100 |
| | (A2) Branched PC1 | | | | | | | | | | | |
| | (A3) FN1200 | | | | | | | | | | | |
| | (A4) FN2500 | | 100 | | | | | | | | | |
| | (B1) Doverphos S-9228PC | | 0.001 | 0.2 | 0.05 | 0.05 | 0.05 | 0.03 | 0.05 | 0.001 | 0.02 | 0.02 |
| | (B2) IRGAFOS 168 | | 0.001 | 0.03 | 0.03 | 0.03 | 0.03 | 0.03 | 0.03 | | | |
| | (C1) IRGANOX 1076 | | 0.07 | 0.07 | 0.20 | 0.07 | 0.07 | 0.07 | | 0.01 | 0.01 | 0.01 |
| | (D1) CELLOXIDE 2021P | | 0.10 | 0.10 | 0.10 | 0.10 | | | 0.10 | 0.10 | 0.10 | 0.10 |
| | (D2) CELLOXIDE 8010 | | | | | | | | | | | |
| | (E1) CYASORB UV-3638F | | 0.15 | 0.15 | 0.15 | | 0.15 | 0.15 | 0.15 | 0.15 | 0.15 | 0.15 |
| | (F1) UNILUBE 50DE-25 | | | | | | | | | | | |
| | (G1) S-100A | | 0.03 | 0.03 | 0.03 | 0.03 | 0.03 | 0.03 | 0.03 | 0.03 | 0.03 | 0.03 |
| | (Z1) ADK STAB PEP-36 | | | | | | | | | | | 0.05 |
| | (Z2) JC-263 | | | | | | | | | | 0.05 | |
| Evaluation result | Initial YI value YI value after molding at 280° C. ($YI_1$) | | 1.40 | 1.63 | 1.24 | 1.33 | 1.21 | 1.28 | 1.19 | 1.60 | 1.34 | 1.10 |
| | Initial haze value After molding at 280° C. | | 0.75 | 0.60 | 0.92 | 0.71 | 0.60 | 0.70 | 0.55 | 0.75 | 0.61 | 0.62 |
| | Heat resistance | YI value after 1,000 hr of storage at 140° C. ($YI_2$) | 2.50 | 3.30 | 7.03 | 2.75 | 8.35 | 8.65 | 1.58 | 2.60 | 4.30 | 1.50 |
| | | $\Delta YI(YI_2 - YI_1)$ | 1.10 | 1.67 | 5.79 | 1.42 | 7.14 | 7.37 | 0.39 | 1.00 | 2.96 | 0.40 |
| | Moist heat resistance | YI value after 1,000 hr of storage at 85° C. and 85% RH ($YI_3$) | 2.80 | 1.64 | 1.30 | 1.35 | 2.19 | 2.40 | 1.20 | 2.90 | 1.50 | 2.80 |
| | | $\Delta YI(YI_3 - YI_1)$ | 1.40 | 0.01 | 0.06 | 0.02 | 0.98 | 1.12 | 0.01 | 1.30 | 0.16 | 1.70 |
| | Light fastness After 1,000 hr of UV irradiation | | 5.90 | 6.20 | 5.10 | 10.67 | 5.20 | 5.30 | 4.82 | 6.10 | 4.90 | 5.20 |
| | LED irradiation resistance Peak ratio after 1,000 hr of irradiation | | 0.45 | 0.75 | 0.15 | 0.39 | 0.55 | 0.58 | 0.90 | 0.67 | 0.75 | 0.47 |

It is found from the results of Table 1 that the polycarbonate resin composition of the present invention has a low initial YI value and a low initial haze value in a short optical path length, and hence has an excellent color tone. Further, it is found that the composition keeps excellent YI values even after its moist heat resistance test and heat resistance test, and is hence excellent not only in long-term heat resistance but also in long-term moist heat resistance. Further, it is found that the polycarbonate resin composition of the present invention is also excellent in light fastness and LED irradiation resistance.

INDUSTRIAL APPLICABILITY

The molded body formed of the polycarbonate resin composition of the present invention has an excellent color tone in a short optical path length and high durability (moist heat resistance, heat resistance, light fastness, and LED irradiation resistance). The molded body is suitable as a lens part for LED lighting.

The invention claimed is:

1. A polycarbonate resin composition, comprising:

an aromatic polycarbonate resin (A);

a pentaerythritol diphosphite compound (B1) represented by the following formula (B1);

a compound (B2) represented by the following formula (B2);

a phenol-based antioxidant (C);

an alicyclic epoxy compound (D); and a UV absorber (E), wherein a content of the component (B1) is 0.01 part by mass or more and 0.08 part by mass or less, a content of the component (B2) is 0.01 part by mass or more and 0.07 part by mass or less with respect to 100 parts by mass of the component (A), a content of the component (C) is 0.005 part by mass or more and 0.15 part by mass or less, a content of the component (D) is 0.005 part by mass or more and 0.2 part by mass or less, and a content of the component (E) is 0.1 part by mass or more and 0.4 part by mass or less with respect to 100 parts by mass of the component (A), and wherein the polycarbonate resin composition is substantially free of bis (2,6-di-tert-butyl-4-methylphenyl) pentaerythritol diphosphite (Z1) and triphenylphosphine (Z2):

(B1)

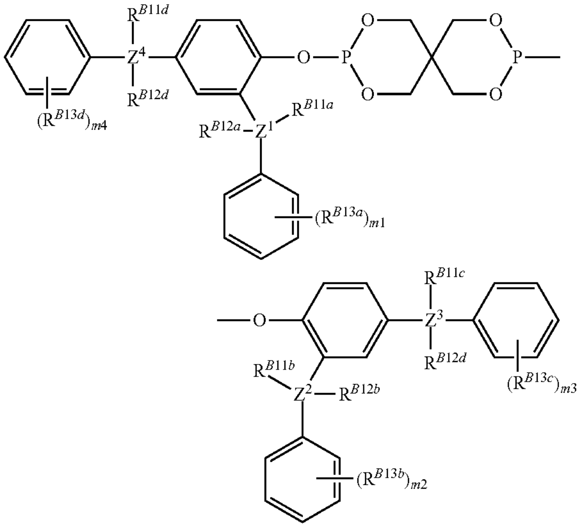

(B2)

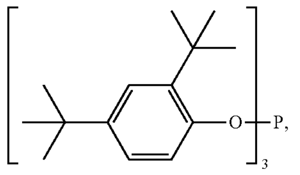

wherein in the formula (B1), $R^{B11a}$ to $R^{B11d}$ and $R^{B12a}$ to $R^{B12d}$ each represent an alkyl group or an alkenyl group, and may be identical to or different from each other, or $R^{B11a}$ and $R^{B12a}$, $R^{B11b}$ and $R^{B12b}$, $R^{B11c}$ and $R^{B12c}$, or $R^{B11d}$ and $R^{B12d}$ may be bonded to each other to form a ring, $R^{B13a}$ to $R^{B13d}$ each represent a hydrogen atom or an alkyl group, and may be identical to or different from each other, m1 to m4 each represent an integer of 0 or more and 5 or less, and may be identical to or different from each other, and when any one of m1 to m4 represents 2 or more, a plurality of $R^{B13a}$s, $R^{B13b}$s, $R^{B13c}$s, or $R^{B13d}$s may be identical to or different from each other, and $Z^1$ to $Z^4$ each represent a single bond or a carbon atom, and may be identical to or different from each other, and when any one of $Z^1$ to $Z^4$ represents a single bond, corresponding two of $R^{B11a}$ to $R^{B11d}$ and $R^{B12a}$ to $R^{B12d}$ are excluded from the formula (B1).

2. The polycarbonate resin composition according to claim 1, wherein the component (E) is a bisbenzoxazinone compound.

3. The polycarbonate resin composition according to claim 1, further comprising a polyether compound (F) represented by the following formula (F1):

$$R^{F3}O—(R^{F1}O)_m\text{-}A\text{-}(R^{F2}O)_n—R^{F4} \quad \text{(F1)}$$

wherein $R^{F1}$ and $R^{F2}$ each represent an alkylene group having 1 or more carbon atoms, and $R^{F1}$ and $R^{F2}$ may be identical to or different from each other, m+n is 5 or more and less than 300, and when "m" represents 2 or more, $R^{F1}$s may be identical to or different from each other, and when "n" represents 2 or more, $R^{F2}$s may be identical to or different from each other, $R^{F3}$ and $R^{F4}$ each represent a hydrogen atom, a monovalent hydrocarbon group having 1 to 30 carbon atoms, an alkanoyl group having 1 to 30 carbon atoms, an alkenoyl group having 2 to 30 carbon atoms, or a glycidyl group, and $R^{F3}$ and $R^{F4}$ may be identical to or different from each other, and A represents a single bond or a divalent organic group, wherein a content of the component (F) is more than 0 parts by mass and 0.4 part by mass or less with respect to 100 parts by mass of the component (A).

4. The polycarbonate resin composition according to claim 1, further comprising a release agent (G).

5. The polycarbonate resin composition according to claim 4, wherein the component (G) is a fatty acid ester (G1), and a content of the component (G) is 0.005 part by mass or more and 0.1 part by mass or less with respect to 100 parts by mass of the component (A).

6. The polycarbonate resin composition according to claim 1, wherein the component (A) contains at least one kind selected from a polycarbonate-based resin (A-1) having a branched structure and an aromatic polycarbonate-based resin (A-2) except the polycarbonate-based resin (A-1) having a branched structure.

7. The polycarbonate resin composition according to claim 1, wherein the component (A) has a viscosity-average molecular weight of 10,000 or more and 30,000 or less.

8. A molded body, comprising the polycarbonate resin composition of claim 1.

9. The polycarbonate resin composition according to claim 1, wherein the content of the component (B1) is 0.02 part by mass or more and 0.05 part by mass or less, the content of the component (B2) is 0.01 part by mass or more and 0.07 part by mass or less with respect to 100 parts by mass of the component (A), the content of the component (C) is 0.05 part by mass or more and 0.12 part by mass or less, the content of the component (D) is 0.03 part by mass or more and 0.15 part by mass or less, and the content of the component (E) is 0.1 part by mass or more and 0.2 part by mass or less with respect to 100 parts by mass of the component (A).

10. The molded body according to claim 8, wherein the molded body is a member for LED lighting.

11. The molded body according to claim 10, wherein the molded body is a lens part.

* * * * *